United States Patent [19]
Patterson

[11] Patent Number: 5,954,968
[45] Date of Patent: Sep. 21, 1999

[54] APPARATUS AND METHOD FOR SEPARATING HEAVY ISOTOPES OF HYDROGEN FROM WATER

[76] Inventor: James A. Patterson, 2074 20th St., Sarasota, Fla. 34234

[21] Appl. No.: 09/063,593

[22] Filed: Apr. 21, 1998

[51] Int. Cl.$^6$ .................................................. B01D 61/00
[52] U.S. Cl. ......................... 210/651; 210/653; 210/640; 95/52
[58] Field of Search ..................... 210/651, 640, 210/195.2, 321.78, 321.8; 95/43–50; 96/4–11

[56] References Cited

U.S. PATENT DOCUMENTS

| | | | |
|---|---|---|---|
| 4,719,016 | 1/1988 | Storkebaum et al. | 210/640 |
| 4,846,977 | 7/1989 | DeVellis et al. | 210/640 |
| 4,933,198 | 6/1990 | Lee et al. | 210/640 |
| 5,057,225 | 10/1991 | van Hook et al. | 210/640 |
| 5,084,181 | 1/1992 | Van Hook et al. | 210/640 |
| 5,204,603 | 4/1993 | Cochran, Jr. | 210/651 |
| 5,232,085 | 8/1993 | Hayashi et al. | 210/500.23 |
| 5,445,771 | 8/1995 | Degen | 210/500.23 |

*Primary Examiner*—Ana Fortuna
*Attorney, Agent, or Firm*—Charles J. Prescott

[57] ABSTRACT

An apparatus and method for separating oxides of heavy isotopes of hydrogen (deuterium oxide and oxides of tritium oxide) from water which is contaminated with these heavy hydrogen isotopes such as that currently being discharged from nuclear power plants. A central aspect of this invention includes an elongated length of hollow core fiber (HCF). By pumping the contaminated water into the HCF on either a static or a dynamic flowing basis, significant amounts of the oxides of heavy hydrogen isotopes remain in the HCF for subsequent disposal, the water discharging from the exit end thereof being substantially lower in heavy hydrogen isotope content.

2 Claims, 6 Drawing Sheets

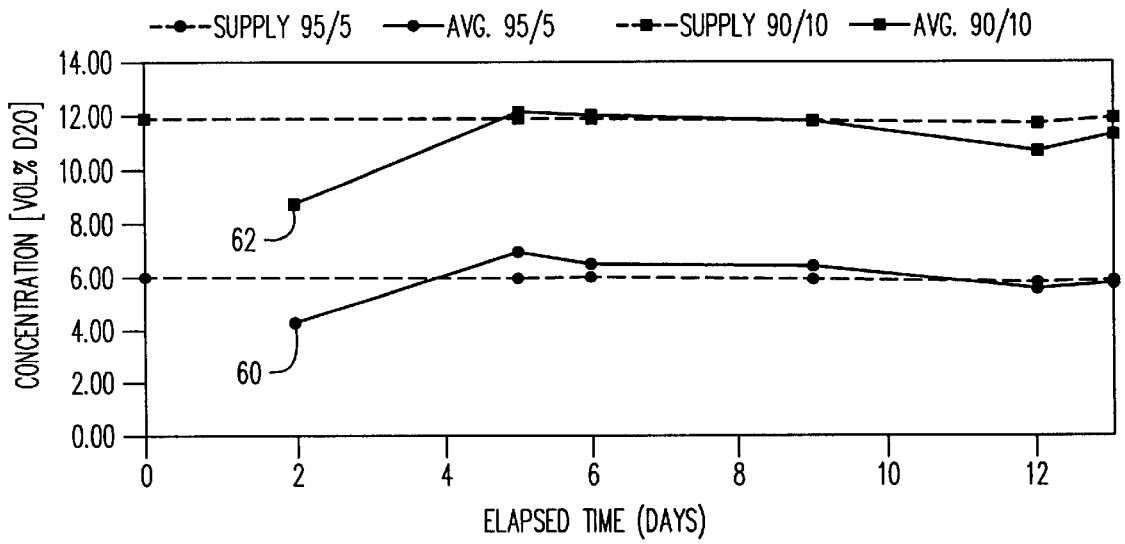
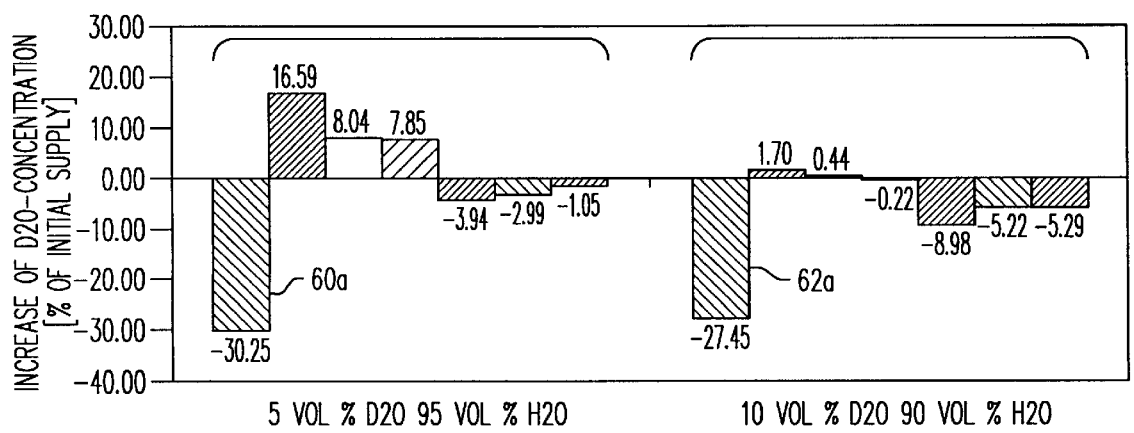

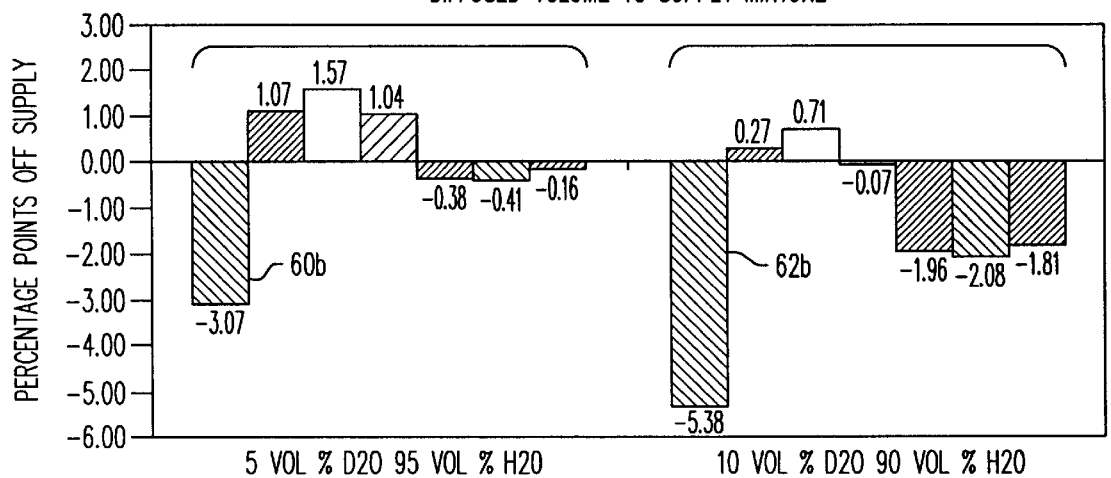
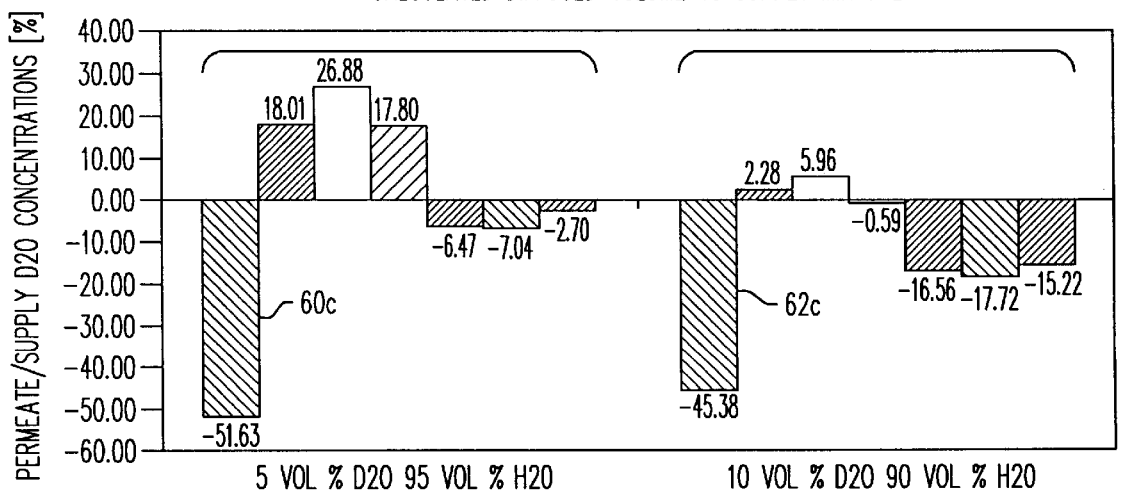

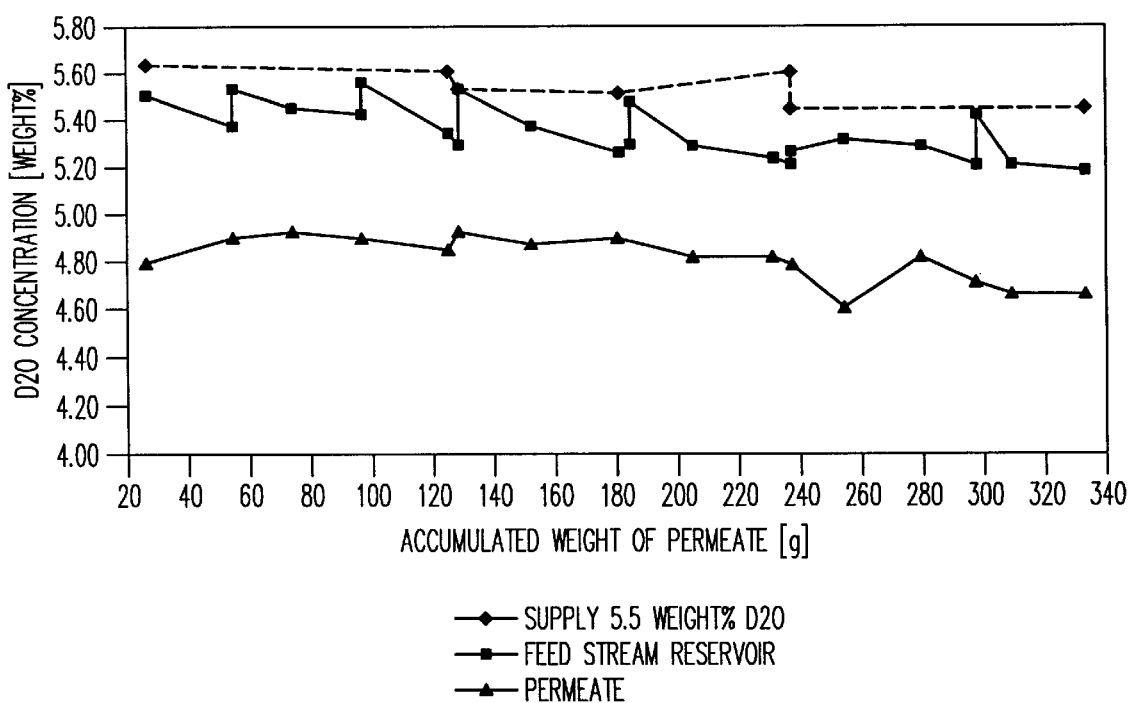

APPARATUS AND METHOD FOR SEPARATING HEAVY ISOTOPES OF HYDROGEN FROM WATER

BACKGROUND OF THE INVENTION

SCOPE OF INVENTION

This invention relates generally to methods and apparatus for separating heavy isotopes of hydrogen, namely deuterium and tritium in their oxide form, from water which is contaminated with these heavy isotopes, and more particularly to an apparatus including the utilization of hollow core fiber as a separation medium.

PRIOR ART

Nuclear power plants must routinely deal with the replacement and disposal of contaminated water taken from the core reactor which is laden with heavy isotopes of hydrogen, namely deuterium oxides and tritium oxides. Tritium oxide in particular is highly radioactive having a half life of about twelve and one half years emitting beta rays to form helium.

Periodically, the contaminated water from nuclear reactors must be replaced. It has become industry practice to dispose of the old contaminated water by simply dispersing it over adjacent ground areas. This is stressful to the environment as the deuterium oxides and tritium oxides are now known to have now contaminated ground water sources. There appears to be no effective and economically practical means for otherwise disposing of this contaminated water so that this practice of ground disposal continues.

The present invention provides an economical alternative to ground disposal of contaminated water whereby the deuterium oxide and tritium oxide isotopes are held within lengths of hollow core fiber formed of cellulose acetate. Contaminated water is statically held or flowed through lengths of the filled hollow core fiber, substantially purified water being removed or discharging therefrom with the heavy isotopes of hydrogen being retained or combined within the hollow core fiber for appropriate disposal.

BRIEF SUMMARY OF THE INVENTION

This invention is directed to an apparatus and method for separating heavy isotopes of hydrogen (deuterium and tritium in their oxide form) from water which is contaminated with these heavy hydrogen isotopes such as that currently being discharged from nuclear power plants. A central aspect of this invention includes statically placing or flowing contaminated water into or through, respectively, an elongated length of hollow core fiber. By statically holding in, or passing the contaminated water through the hollow core fiber, significant amounts of the heavy hydrogen isotopes remain in the hollow core fiber for subsequent disposal, the permeate removed from, or the water discharging from the hollow core fiber being substantially lower in heavy hydrogen isotope content.

It is therefore an object of this invention to provide an environmentally safe alternative to the ground dispersion of water contaminated with heavy isotopes of hydrogen.

It is yet another object of this invention to provide a means for separating the oxides of heavy isotopes of hydrogen from contaminated water.

In accordance with these and other objects which will become apparent hereinafter, the instant invention will now be described with reference to the accompanying drawings.

BRIEF DESCRIPTION OF THE DRAWINGS

FIG. 3 is a graphic display of the effectiveness of the static or zero flow embodiment of the invention in reducing the deuterium oxide (D2O) level in pure test water contaminated with 5% and 10% D2O.

FIG. 4 is a bar graph representation of the data of FIG. 3 showing the change in concentration of deuterium oxide in the retentate after testing.

FIG. 5 is another bar graphic presentation of the data derived from FIG. 3 showing the percentage of deuterium oxide diffused into or through the hollow core fiber.

FIG. 6 is another bar graphic display of the data of FIG. 3 showing the ratio of percentage change in the diffused volume to the supply media.

FIG. 9 is a graphic display of the effectiveness of the dynamic or flowing embodiment of the invention in reducing the deuterium oxide (D2O) level in pure test water contaminated with 5.5% D2O by weight.

DETAILED DESCRIPTION OF THE INVENTION

Figure 1:
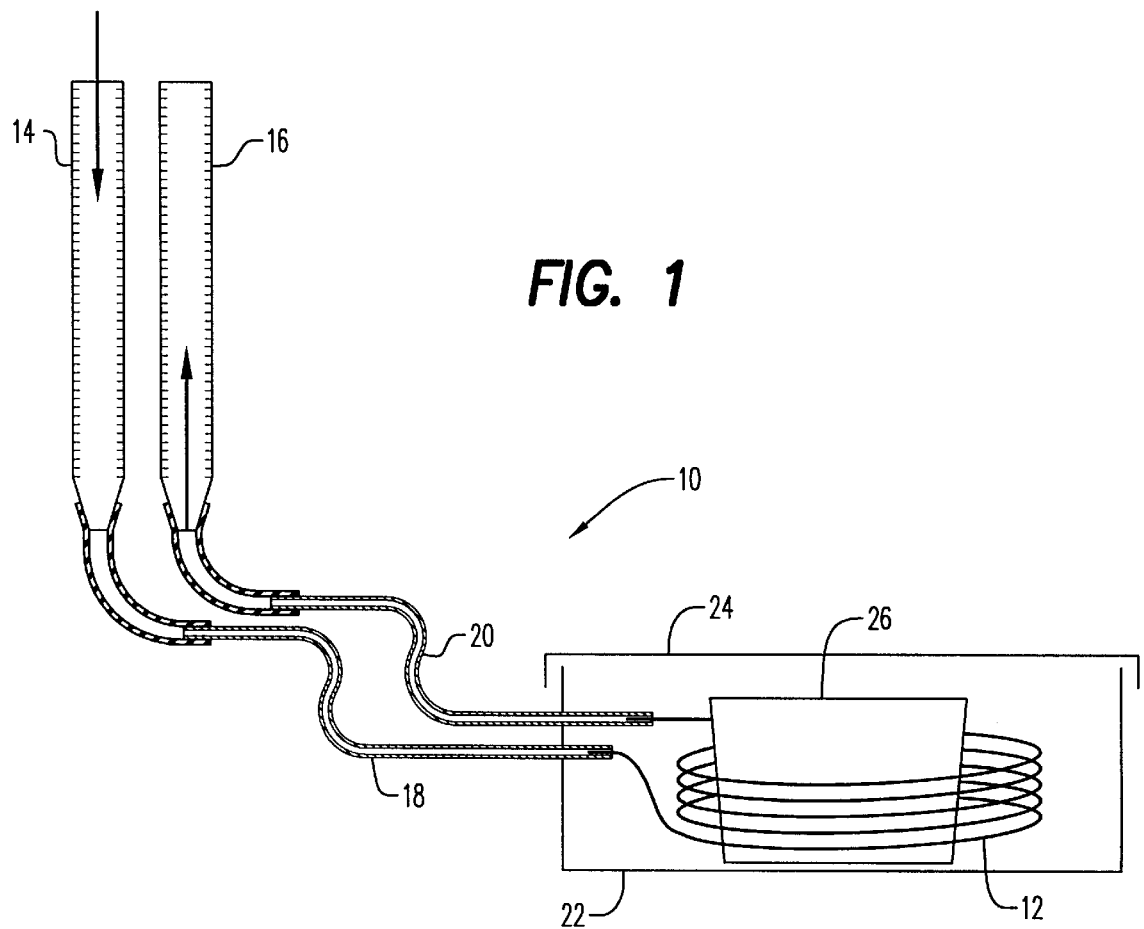
FIG. 1 is a simplified schematic view of the static test embodiment of the invention.

Referring now to the drawings, the static or no-flow embodiment of the invention is shown generally at numeral 10 in FIG. 1 and includes a length or coil of hollow core fiber 12 which is formed of cellulose acetate. The particular features of this hollow core fiber 12 used in the experiments reported below are an inside diameter of 1.3 mm (range of 1.1 to 1.7 mm), a wall thickness of 0.2 mm (range of 0.10 to 0.25 mm), an outside diameter in the range of 1.6 to 1.9 mm, and a density of about 1.20 g/cm$^3$. Test sample length was 100".

An inlet end of the hollow core fiber length 12 is connected to a plastic feed line 18 which leads to an open pipette 14 which is filled with water contaminated with heavy isotopes of hydrogen, namely deuterium oxide. This contaminated water is fed in the direction of the arrow through connecting plastic tubing 18 into the hollow core fiber 12. When the hollow core fiber 12 is filled, contaminated water will flow from plastic tube 20 into a second pipette 16 to achieve static equilibrium.

Radioactive tritium oxide is unavailable for routine, unregulated use, but because the tritium oxide molecule is much larger than both hydrogen and deuterium oxide, the results reported herebelow for deuterium oxide (D2O) separation from light water (H2O) apply at least equally well for tritium oxide separation. Data was obtained using a similar set-up and procedure feeding very dilute tritium oxide and significant separations were observed as shown in FIG. 9 and described herebelow.

The hollow core fiber 12 is housed within a hermetically sealed enclosure formed of a bottom 22 and a sealed lid 24. For spatial convenience, the coiled hollow core fiber 12 is positioned around a humidity absorber 26. This arrangement helps to insure accuracy of data taken as reported herebelow. The experiments with tritium oxide (HTO) were performed without the enclosure 22 and 24 and without the humidity absorber 26.

Figure 2:
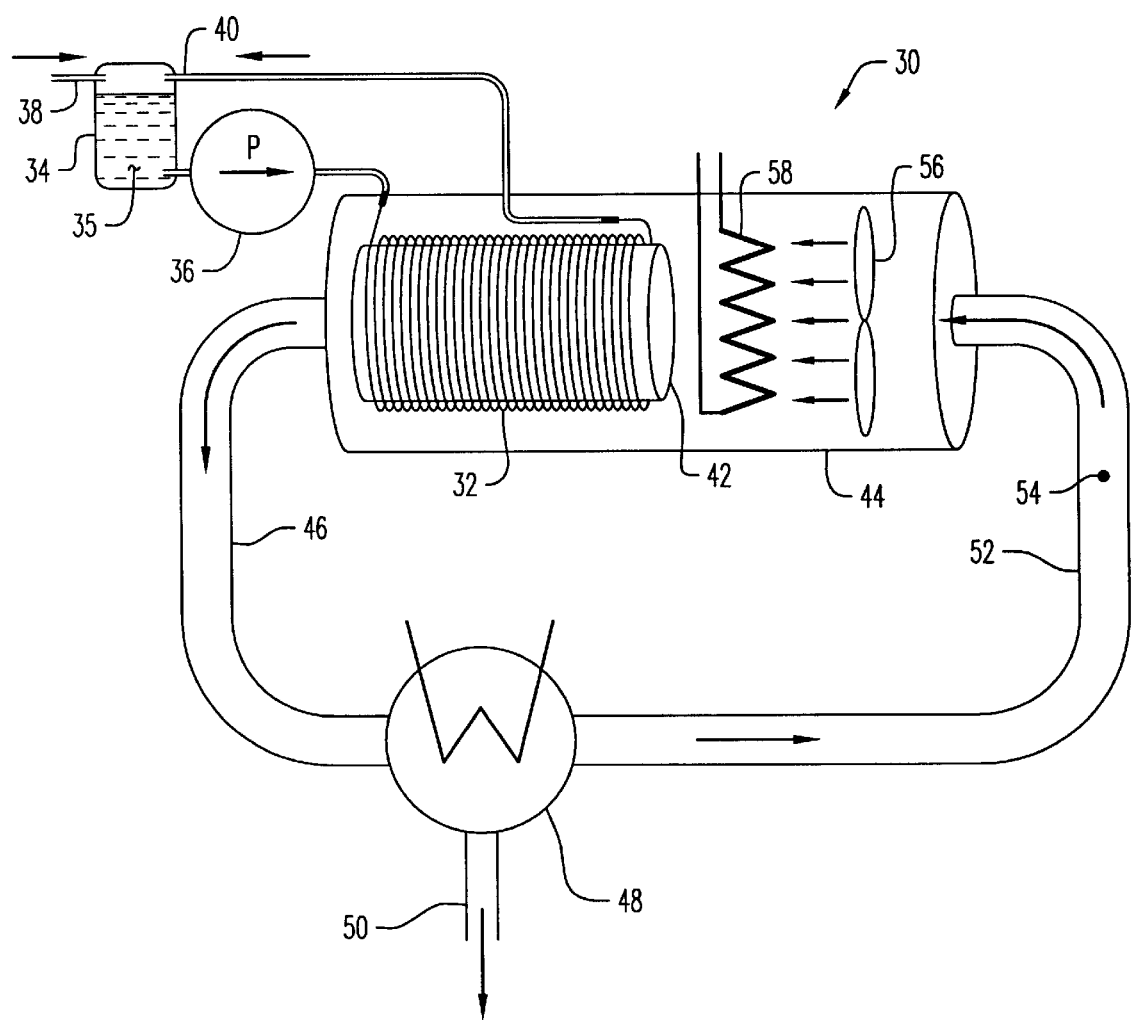
FIG. 2 is a simplified schematic view of a dynamic or flowing embodiment of the invention.

Referring now to FIG. 2, the dynamic or flowing embodiment of the invention is shown generally at numeral 30. This apparatus 30 includes a coiled length of hollow core fiber 32 which, for convenience, is positioned around a support cylinder 42 housed within a sealed cylindrical container 44.

One end of the hollow core fiber 32 is connected to a pump 36 which delivers contaminated water 35 within reservoir 34 in the form of purified water mixed with deuterium oxide (D2O) in the percentage ranges described herebelow. The flowing contaminated water or media 35 exits from the hollow core fiber 32 in the direction of the arrow at 40 to return to the reservoir 34 for recombination with the media 35 remaining in the reservoir 34. The reservoir 34 is initially filled through fill tube 38 and replenished thereby as required. Media pumping rate is set at 0.8 ml/minute. Thermocouple 54 was utilized to monitor the air flow temperature which was maintained at approximately 30° C.

An axial fan 56 within container 44 flows air over heating element 58 to elevate the air temperature flowing over the hollow core fiber coil 32, the recirculating air being drawn into sealed chamber 44 through conduit 52 and exiting through conduit 46 on a generally steady state basis. The circulating air is dewatered through condenser 48, the pervaporated water (permeate) being condensed and drained therefrom through drainage tube 50. The length of the hollow core fiber 32 in this test apparatus 30 was approximately 1200 inches in length.

STATIC DIFFUSION TEST RESULTS

SAMPLE PREPARATION

In evaluating the performance of the static diffusion apparatus, three samples for each set of parameters to be tested were prepared. Samples numbered 1 to 3 were prepared by combining 5% of deuterium oxide with 95% pure water (by weight), while samples 4 through 6 were prepared having a 10% ratio of deuterium oxide to pure water.

Each test sample or media was poured into the filling pipette 14 of FIG. 1 until the entire length of hollow core fiber 12 was filled and the media began to rise in the exit pipette 16. Again, the length of hollow core fiber 12 utilized in these experiments was established at 100 inches. Each test setup was filled with 6 to 8 ml of the appropriate fresh media. Each time samples were taken, each of the sets of hollow core fiber 12 were completely emptied of the retentate and refilled with new media from a premixed supply to provide a constant feed concentration of deuterium oxide.

PRETEST DATA

Tables I to III herebelow set forth the specific data regarding each of the six sets of HCF. In Table I, the net weight of each of the samples associated with each of the elapsed test time (in days) are there shown for both the 5% and 10% deuterium oxide concentration feeds (by weight). Table II reflects the same data shown in Table I by net volume (ml). Table III shows the separate amounts by volume (ml) of pure deuterium oxide and pure light water which were put in each of the media samples totaling 8 ml per sample (6 ml for the last two fillings).

TABLE I

STATIC DIFFUSION
NET SAMPLE WEIGHT (gms.)

| Elapsed Time (Days) | No. Times Filled | 5% D20 Feed | | | 10% D20 Feed | | |
|---|---|---|---|---|---|---|---|
| | | Sample 1 | Sample 2 | Sample 3 | Sample 4 | Sample 5 | Sample 6 |
| 2 | 1st | 5.04 | 4.85 | 4.43 | 4.97 | 5.01 | 5.17 |
| 5 | 2nd | 4.73 | 4.31 | 4.16 | 4.18 | 4.77 | 4.83 |
| 6 | 3rd | 5.44 | 6.42 | 6.29 | 5.65 | 6.01 | |
| 9 | 4th | 5.83 | 5.59 | 5.42 | 5.69 | 5.29 | 4.90 |
| 12 | 5th | 4.68 | 4.09 | 4.46 | 4.74 | 5.23 | 5.37 |
| 13 | 6th | 4.22 | 5.08 | 4.97 | 4.96 | 4.93 | 4.95 |
| 16 | 7th | 4.49 | 4.48 | 4.31 | 4.59 | 4.44 | 4.47 |

TABLE II

STATIC DIFFUSION
NET SAMPLE VOLUME (ml)

| Elapsed Time (Days) | No. Times Filled | 5% D20 Feed | | | 10% D20 Feed | | |
|---|---|---|---|---|---|---|---|
| | | Sample 1 | Sample 2 | Sample 3 | Sample 4 | Sample 5 | Sample 6 |
| 2 | 1st | 5.03 | 4.84 | 4.42 | 4.91 | 4.94 | 5.10 |
| 5 | 2nd | 4.72 | 4.30 | 4.15 | 4.13 | 4.71 | 4.77 |
| 6 | 3rd | 5.43 | 6.41 | 6.28 | 5.58 | 5.93 | |
| 9 | 4th | 5.82 | 5.58 | 5.41 | 5.62 | 5.22 | 4.84 |
| 12 | 5th | 4.67 | 4.08 | 4.45 | 4.68 | 5.16 | 5.30 |
| 13 | 6th | 4.21 | 5.06 | 4.96 | 4.89 | 4.86 | 4.88 |
| 16 | 7th | 4.48 | 4.47 | 4.30 | 4.53 | 4.38 | 4.41 |

TABLE III

STATIC DIFFUSION
VOLUME OF PURE H20 & PURE D20 (ml)
IN EACH SAMPLE AS FILLED

| No. Times Filled | Vol. Pure D20 (ml) | | Vol. Pure H20 (ml) | |
|---|---|---|---|---|
| | Samples 1–3 | Samples 4–6 | Samples 1–3 | Samples 4–6 |
| 1st | 0.48 | 0.95 | 7.52 | 7.05 |
| 2nd | 0.48 | 0.95 | 7.52 | 7.05 |
| 3rd | 0.47 | 0.95 | 7.53 | 7.05 |
| 4th | 0.47 | 0.95 | 7.53 | 7.05 |
| 5th | 0.47 | 0.94 | 7.53 | 7.06 |
| 6th | 0.35 | 0.70 | 5.65 | 5.30 |
| 7th | 0.35 | 0.71 | 5.65 | 5.29 |

TEST RESULTS

The concentration of deuterium oxide as a volumetric percentage of the total sample volume, both before testing and as a permeate after testing, was determined by carefully establishing the freezing point of each sample. The freezing point of pure light water is 0.0° C., while the freezing point of pure deuterium oxide is 3.82° C. The freezing point measurements were taken utilizing an Advanced Instruments Osmometer, Model 5600. The conversion from freezing point to percent deuterium oxide is assumed to be a linear relationship.

Referring now to FIG. 3, the actual test data taken associated with the static diffusion embodiment 10 of FIG. 1 using nominal test sample concentrations of 5% and 10% deuterium oxide by volume are there shown. The horizontal dotted lines depict the actual concentration levels determined by freezing point technique above described for each of the two media samples before testing. Note that the actual concentration of deuterium oxide (6% and 12% by volume) was slightly higher than the actual concentration of deuterium oxide (by weight) of the prepared test sample. However, the relative data, all of which was measured by actual freezing point tests, is viewed as otherwise being very accurate.

Again, for each of the test parameters, three samples for each data point were taken and averaged at each of the respective elapsed time periods and for each of the two concentrations of deuterium oxide. For example, after two days of allowing the prepared test media to sit statically within the hollow core fiber 12 in the test sample 10 of FIG. 1, the retentate removed from the hollow core fiber at nominal 5% deuterium oxide concentration (6% as determined by freezing point testing) showed a decrease in deuterium oxide concentration down to about 4.3% by volume at point 60, while the 10% deuterium oxide concentration (12% as determined by freezing point testing) had dropped in concentration to about 8.88% as shown at point 62.

Based upon the graphic presentation of test data shown in FIG. 3, it would appear that the greatest benefit achieved for separating deuterium oxide from light water occurs in the first filling of the HCF, in this case two days of allowing the retentate to statically soak within the length of hollow core fiber material 12. Removal of the retentate and refilling the same hollow core fiber sample for a second soak appears to produce diminishing separation effectiveness of the deuterium oxide from the light water in each test sample.

Referring now to Table IV herebelow, the calculated volumes of deuterium oxide and light water for each of the two percentage concentration test samples is there shown. These values are with respect to the retentate removed after testing for the indicated days of elapsed time for each of the test samples.

TABLE IV

STATIC DIFFUSION VOL. (ml)
of PURE D2O & PURE H2O IN SAMPLES
AFTER ELAPSED DIFFUSION TIME

| Total Elapsed Time (Days) | No. Times Filled | VOLUME OF PURE D2O | | | | | | VOLUME OF PURE H2O | | | | | |
|---|---|---|---|---|---|---|---|---|---|---|---|---|---|
| | | 5% D2O Feed | | | 10% D2O Feed | | | 5% D2O Feed | | | 10% D2O FE | | |
| | | Sample 1 | Sample 2 | Sample 3 | Sample 4 | Sample 5 | Sample 6 | Sample 1 | Sample 2 | Sample 3 | Sample 4 | Sample 5 | Sample 6 |
| 2 | 1st | 0.22 | 0.20 | 0.18 | 0.42 | 0.43 | 0.44 | 4.81 | 4.64 | 4.24 | 4.49 | 4.52 | 4.66 |
| 5 | 2nd | 0.32 | 0.30 | 0.27 | 0.48 | 0.62 | 0.54 | 4.40 | 4.00 | 3.88 | 3.65 | 4.09 | 4.23 |
| 6 | 3rd | 0.35 | 0.41 | 0.39 | 0.65 | 0.74 | | 5.08 | 6.00 | 5.89 | 4.92 | 5.20 | |
| 9 | 4th | 0.37 | 0.35 | 0.33 | 0.65 | 0.65 | 0.55 | 5.44 | 5.23 | 5.08 | 4.96 | 4.57 | 4.28 |
| 10 | 5th | 0.26 | 0.23 | 0.24 | 0.49 | 0.56 | 0.56 | 4.41 | 3.85 | 4.21 | 4.19 | 4.60 | 4.74 |
| 13 | 6th | 0.24 | 0.29 | 0.28 | 0.55 | 0.55 | 0.55 | 3.97 | 4.78 | 4.68 | 4.35 | 4.31 | 4.34 |
| 16 | 7th | 0.28 | 0.26 | 0.24 | 0.50 | 0.50 | 0.49 | 4.22 | 4.21 | 4.05 | 4.02 | 3.88 | 3.92 |

Referring now to FIG. 4, the bar graph shows the percentage changes in deuterium oxide concentration in the retentate after testing and removal as a percentage by volume from the pre-test concentration based upon the data shown in FIG. 3. For example, reference point 60 of FIG. 3 reflects a percentage decrease in deuterium oxide concentration of 30.25 shown in bar 60a of FIG. 4. Similarly, the percentage decrease of deuterium oxide in the permeate of 27.45 shown in bar 62a of FIG. 4 reflects the percentage decrease of data point 62 of FIG. 3. Here again, the dramatic effectiveness of the invention after only two days of static soaking within the hollow core fiber test sample is clearly depicted. Note that the last data set taken at day 16 shown in Table IV is not plotted in FIG. 3, but is shown in FIG. 4.

ESTABLISHING DIFFUSED VOLUME

Applicant has attempted to establish calculated data which demonstrates that there appears to be two modes or mechanisms of separation of deuterium oxide from light water which are occurring in each of the test samples. By molecular exchange with water of hydration within hollow core fiber, deuterium oxide appears to be decreasing in the test sample as it statically sits in each of the hollow core fiber samples. This is reflected in the above data which was carefully taken to evaluate the contents of the retentate after testing. However, the total volume and calculated volume of deuterium oxide and light water contained within each of the retentate samples reflects that some of the test sample has remained within the hollow core fiber material itself. This "missing" permeate sample is presumed to have diffused into and/or through the walls of the cellulose acetate material forming the hollow core fiber.

To calculate the amount of diffused liquid of both deuterium oxide and light water, refer to Table V herebelow.

TABLE V

STATIC DIFFUSION
CALCULATION OF VOLUME OF PURE D2O & PURE H2O
DIFFUSED THROUGH OR/AND INTO HOLLOW CORE FIBER

| Total Elapsed Time (Days) | No. Times Filled | VOLUME OF PURE D2O | | | | | | VOLUME OF PURE H2O | | | | | |
|---|---|---|---|---|---|---|---|---|---|---|---|---|---|
| | | 5% D2O Feed | | | 10% D2O Feed | | | 5% D2O Feed | | | 10% D2O FE | | |
| | | Sample 1 | Sample 2 | Sample 3 | Sample 4 | Sample 5 | Sample 6 | Sample 1 | Sample 2 | Sample 3 | Sample 4 | Sample 5 | Sample 6 |
| 2 | 1st | 0.26 | 0.28 | 0.30 | 0.53 | 0.52 | 0.51 | 2.72 | 2.88 | 2.81 | 2.56 | 2.53 | 2.39 |
| 5 | 2nd | 0.15 | 0.18 | 0.20 | 0.47 | 0.33 | 0.41 | 3.13 | 3.52 | 3.65 | 3.41 | 2.96 | 2.83 |
| 6 | 3rd | 0.12 | 0.06 | 0.08 | 0.29 | 0.21 | 2.46 | 1.54 | 1.65 | 2.13 | 1.86 | | |
| 9 | 4th | 0.09 | 0.12 | 0.14 | 0.30 | 0.30 | 0.40 | 2.09 | 2.31 | 2.46 | 2.09 | 2.48 | 2.77 |
| 10 | 5th | 0.21 | 0.24 | 0.23 | 0.45 | 0.38 | 0.38 | 3.13 | 3.68 | 3.32 | 2.87 | 2.46 | 2.32 |
| 13 | 6th | 0.11 | 0.06 | 0.07 | 0.16 | 0.15 | 0.16 | 1.68 | 0.88 | 0.97 | 0.95 | 0.99 | 0.96 |
| 16 | 7th | 0.09 | 0.09 | 0.11 | 0.21 | 0.21 | 0.22 | 1.43 | 1.44 | 1.60 | 1.26 | 1.41 | 1.37 |

The data points of Table V represent calculations of the volume of the diffused components. These calculations were based upon the volume of media placed into the test system 10 of FIG. 1 and the total volume and the determination of components contained within the retentate removed in order to calculate the volume of deuterium oxide diffusing into or through the cellulose acetate material of the hollow core fiber membrane.

Referring now to FIG. 5 and Table VI, the calculated difference is presented as a percentage, setting the contents of the feed as a zero reference.

Thus, carrying the example from FIGS. 3 and 4, bar 60b shows an average decrease of 3.07% points for the three samples 1–3, (5% deuterium oxide) with respect to the D2O feed concentration. The supply D2O concentration being at 5.94%, a decrease of 3.07% points means a resulting calculated D2O concentration in the permeate of 2.87%. The 10% deuterium oxide media sampled (Samples 4–6) show an average decrease of 5.38% points after two days of static soaking when compared to the supply as shown at bar 62b.

Table VII shown herebelow and FIG. 6 show the same information as described in FIG. 5 and Table VI with the exception that the percentage changes there shown are not percentage points of D2O concentration, but percentages with respect to the concentrations of the supply media.

TABLE VI

CALCULATED Δ% CONCENTRATION
OF D2O IN SUPPLY MEDIA VS.
CALCULATED $D_2O$ % IN MEDIA THROUGH OR/AND
INTO HCF [PERCENTAGE POINTS]

| Elapsed Time (Days) | No. Times Filled | Supply | 5% D2O Feed | | | Supply | 10% D2O Feed | | | 5% Avg. 1–3 | 10% Avg. 4–6 |
|---|---|---|---|---|---|---|---|---|---|---|---|
| | | | Sample 1 | Sample 2 | Sample 3 | | Sample 4 | Sample 5 | Sample 6 | | |
| 2 | 1st | 5.94 | −2.66 | −2.89 | −3.66 | 11.86 | −5.31 | −5.25 | −5.58 | −3.07 | −5.38 |
| 5 | 2nd | 5.94 | 1.32 | 1.19 | 0.71 | 11.86 | −0.25 | 1.80 | −0.73 | 1.07 | 0.27 |
| 6 | 3rd | 5.84 | 1.27 | 2.10 | 1.33 | 11.83 | −0.24 | 1.65 | | 1.57 | 0.71 |
| 9 | 4th | 5.86 | 1.53 | 1.02 | 0.57 | 11.86 | −0.57 | 0.98 | −0.63 | 1.04 | −0.07 |
| 10 | 5th | 5.84 | −0.33 | −0.25 | −0.56 | 11.81 | −1.88 | −1.57 | −2.42 | −0.38 | −1.96 |
| 13 | 6th | 5.76 | −0.19 | −0.28 | −0.75 | 11.71 | −2.49 | −1.40 | −2.34 | 00.41 | −2.08 |
| 16 | 7th | 5.84 | 0.00 | −0.08 | −0.40 | 11.88 | −2.33 | −1.13 | −1.96 | −0.16 | −1.81 |

TABLE VII

CALCULATED Δ% CONCENTRATION
% OF D2O IN SUPPLY MEDIA VS. CALCULATED
$D_2O$ IN MEDIA DIFFUSED THROUGH OR/AND INTO HCF
[% OF SUPPLY]

| Elapsed Time | | 5% D2O Feed | | | 10% D2O Feed | | | 5% | 10% |
|---|---|---|---|---|---|---|---|---|---|
| (Days) | | Sample 1 | Sample 2 | Sample 3 | Sample 4 | Sample 5 | Sample 6 | Avg. 1–3 | Avg. 4–6 |
| 2 | 1st | −44.73 | −48.55 | −61.61 | −44.79 | −44.30 | −47.04 | −51.63 | −45.38 |
| 5 | 2nd | 22.18 | 19.97 | 11.87 | −2.12 | 15.16 | −6.18 | 18.01 | 2.28 |
| 6 | 3rd | 21.76 | 36.02 | 22.85 | −2.04 | 13.96 | | 26.88 | 5.96 |
| 9 | 4th | 26.16 | 17.47 | 9.78 | −4.78 | 8.30 | −5.29 | 17.80 | −0.59 |
| 10 | 5th | −5.66 | −4.20 | −9.55 | −15.93 | −13.31 | −20.46 | −6.47 | −16.56 |
| 13 | 6th | −3.21 | −4.92 | −13.00 | −21.22 | −11.94 | −19.99 | −7.04 | −17.72 |
| 16 | 7th | 0.00 | −1.31 | −6.78 | −19.62 | −9.54 | −16.51 | −2.70 | −15.22 |

Again, carrying the same example from FIGS. 3 and 4, bar 60c shows a decrease of 51.63% of the average of three test samples (Samples 1–3, 5% deuterium oxide feed) with respect to the D2O concentration in the sample feed media as shown at bar 60c. Bar 62c demonstrates a decrease of 45.38% in deuterium oxide concentration from that of the 10% pretest feed media. As in FIG. 5, these two particular examples at 5% and 10% deuterium oxide levels clearly reinforce the effectiveness of the apparatus 10 after only two days of media static soaking in the hollow core fiber 12.

Figure 7:
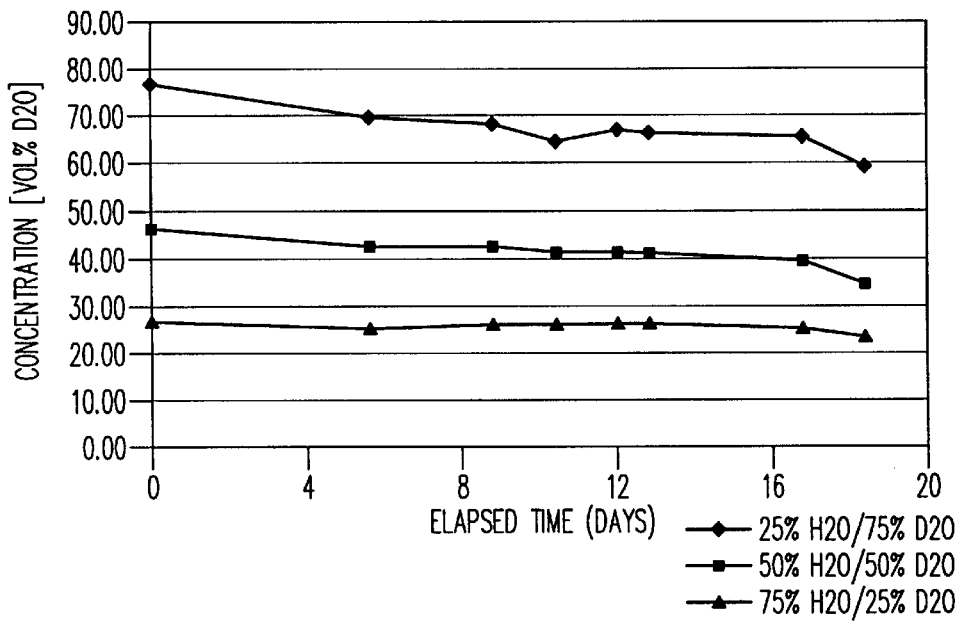
FIG. 7 is a graphic display of the effectiveness of the static embodiment of the invention in reducing deuterium oxide (D2O) level in pure test water contaminated with higher levels of deuterium oxide (25%, 50% and 75% D2O).

Referring now to FIG. 7, static experiments as above described were also conducted utilizing a test media with higher concentrations of deuterium oxide. Static tests were run utilizing a media of 25%, 50% and 75% deuterium oxide concentrations. This data reveals that the static apparatus shown in FIG. 1 may be more effective in separating deuterium oxide from light water where concentrations of deuterium oxide are higher, e.g. 75% deuterium oxide concentrations. The tabularized results shown in FIG. 7 are shown in Table VII herebelow.

TABLE VIII

STATIC DIFFUSION
HIGHER D20 CONCENTRATIONS

| Elapsed Time | 25% H20 / 75% $D_2$0 | | 50% H20 / 50% $D_2$0 | | 75% H20 / 25% $D_2$0 | |
|---|---|---|---|---|---|---|
| (Days) | FzPt | % $D_2$0 | FzPt | % $D_2$0 | FzPt | % $D_2$0 |
| 0 | 2.904 | 76.21 | 1.731 | 45.69 | 0.990 | 26.39 |
| 7 | 2.645 | 69.46 | 1.597 | 42.19 | 0.927 | 24.75 |
| 11 | 2.588 | 67.99 | 1.599 | 42.25 | 0.964 | 25.72 |
| 13 | 2.446 | 64.28 | 1.545 | 40.83 | 0.959 | 25.59 |
| 15 | 2.550 | 66.75 | 1.567 | 41.02 | 0.992 | 25.97 |
| 16 | 2.535 | 66.36 | 1.555 | 40.71 | 0.995 | 26.05 |
| 21 | 2.492 | 65.24 | 1.512 | 39.58 | 0.956 | 25.03 |
| 23 | 2.265 | 59.29 | 1.323 | 34.63 | 0.890 | 23.30 |

Figure 8:
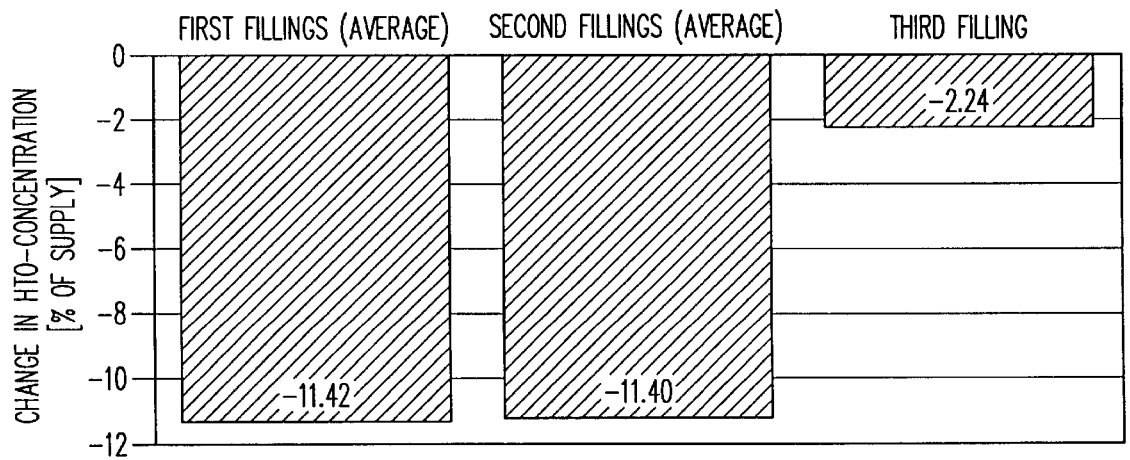
FIG. 8 is a bar graph representation of the static or zero flow embodiment of the invention in reducing the mixed tritium oxide (HTO) level in pure test water contaminated with 1.7 parts per trillion of HTO.

Referring now to FIG. 8, a limited number of experiments were performed using very dilute tritium oxide (HTO) in water ($H_2O$). The feed concentration into the static hollow core fiber as 2.7 $\mu$ Ci/eT (equivalent to 1.7 parts per trillion). Tritium was measured by scintillation counting. The hollow core fibers were identical each having a length of 100" and dimensionally the same as previously described. In the tritium experiments, no enclosure was used and there was no absorbent for the diffusing specimens.

Each test sample or media was poured into the pipette 14 of FIG. 1 until the entire length of the hollow core fiber 12 was filled and the media began to rise in the exit pipette 16. Each test set-up was filled with 8 to 10 ml of test media. After the feed was reduced to the point that the feed pipette 14 was substantially emptied, contaminated water from within the hollow core fiber was drained and the HTO concentration determined by liquid scintillation counting.

The results of these experiments are shown in FIG. 8 and demonstrate that the hollow core fiber is effective in tritium oxide separation, as well as deuterium oxide separation from light water $H_2O$. As before, the greatest effect was observed in the first filling.

Referring to FIG. 9, the results of the dynamic or flowing media for embodiment of the invention as described with respect to FIG. 2 is there shown. These data plots and connecting curves show the variation in concentrations of deuterium oxide in elapsed time (hours) for two different media samples. The media sample was prepared with a 5.5% D2O concentration by weight, 94.5% H2O. The outlet stream from the hollow core fiber 32 is recycled through plastic conduit 40 into the feed stream reservoir 34.

The average D2O concentration within the reservoir 34 was measured by freezing point analysis as above described to be 5.34% by weight while the average D2O concentration of the permeate was 4.8% D2O. This represents a decrease of 9.9% corresponding to a separation factor of 1.12 with respect to the reservoir.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A method of reducing the concentration of heavy isotopes of hydrogen in liquid form from contaminated water containing the heavy isotopes comprising the steps of:
   A. connecting one end of a length of hollow core fiber (HCF) to a supply of the contaminated water, said HCF formed of a substantially hydrophilic material to permeate water outwardly through the sidewall thereof while substantially limiting permeation of the heavy isotypes of hydrogen outwardly through said side wall;
   B. pumping the contaminated water into said HCF for a period of time sufficient to substantially reduce the amount of heavy hydrogen isotopes and a substantial portion of water from the contaminated water before a remaining portion thereof is discharged from the other end of said HCF, the substantial portion of water being removed from the contaminated water by permeation out through said sidewall, the heavy hydrogen isotopes being removed from the contaminated water attaching to or retained within said HCF when the remaining portion of contaminated water is discharged from the HCF.

2. A method as set forth in claim 1, wherein: said hydrophilic material is cellulose acetate.

* * * * *